(12) United States Patent
Matsuda et al.

(10) Patent No.: US 12,413,092 B2
(45) Date of Patent: Sep. 9, 2025

(54) MANAGEMENT APPARATUS FOR ENERGY STORAGE DEVICE AND ENERGY STORAGE APPARATUS

(71) Applicant: GS Yuasa International Ltd., Kyoto (JP)

(72) Inventors: Yuki Matsuda, Kyoto (JP); Masakatsu Fujimatsu, Kyoto (JP); Akimasa Sugiura, Kyoto (JP); Naoya Wada, Kyoto (JP); Satoshi Kunita, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 845 days.

(21) Appl. No.: 17/440,766

(22) PCT Filed: Mar. 6, 2020

(86) PCT No.: PCT/JP2020/009719
§ 371 (c)(1),
(2) Date: Sep. 18, 2021

(87) PCT Pub. No.: WO2020/195715
PCT Pub. Date: Oct. 1, 2020

(65) Prior Publication Data
US 2022/0200328 A1   Jun. 23, 2022

(30) Foreign Application Priority Data
Mar. 22, 2019   (JP) .................... 2019-054789

(51) Int. Cl.
*H02J 7/00*      (2006.01)
*B62J 43/30*     (2020.01)
(Continued)

(52) U.S. Cl.
CPC ............... *H02J 9/061* (2013.01); *B62J 43/30* (2020.02); *F02N 11/0862* (2013.01);
(Continued)

(58) Field of Classification Search
CPC ...... H02J 7/345; H02J 7/0063; H02J 7/00304; H02J 9/061
See application file for complete search history.

(56) References Cited

U.S. PATENT DOCUMENTS

2012/0004798 A1   1/2012   Sakamoto et al.
2014/0104739 A1   4/2014   Nakamoto et al.
(Continued)

FOREIGN PATENT DOCUMENTS

EP    2 361 827 A2    8/2011
EP    2 930 347 A1   10/2015
(Continued)

OTHER PUBLICATIONS

International Search Report (ISR) (PCT Form PCT/ISA/210), in PCT/JP2020/009719, dated Apr. 7, 2020.

*Primary Examiner* — Robert Grant
(74) *Attorney, Agent, or Firm* — McGinn I.P.Law Group, PLLC (57) ABSTRACT

A BMU (management apparatus) of a secondary battery (energy storage device) includes a management part that operates by power supplied from the secondary battery, and a capacitor (backup power source) that supplies power to the management part when a voltage of the secondary battery decreases.

17 Claims, 7 Drawing Sheets

(51) Int. Cl.
  *F02N 11/08* (2006.01)
  *F02N 11/10* (2006.01)
  *H01M 10/42* (2006.01)
  *H01M 10/48* (2006.01)
  *H02H 3/08* (2006.01)
  *H02H 7/16* (2006.01)
  *H02H 7/18* (2006.01)
  *H02J 7/34* (2006.01)
  *H02J 9/06* (2006.01)
  *B60R 16/033* (2006.01)
  *B62J 43/16* (2020.01)

(52) U.S. Cl.
  CPC ........... *F02N 11/10* (2013.01); *H01M 10/425* (2013.01); *H01M 10/48* (2013.01); *H02H 3/08* (2013.01); *H02H 7/16* (2013.01); *H02H 7/18* (2013.01); *H02J 7/00304* (2020.01); *H02J 7/0063* (2013.01); *H02J 7/345* (2013.01); *B60R 16/033* (2013.01); *B62J 43/16* (2020.02); *H01M 2010/4271* (2013.01); *H01M 2220/20* (2013.01)

(56) References Cited

U.S. PATENT DOCUMENTS

| | | |
|---|---|---|
| 2015/0042160 A1 | 2/2015 | Matsuda |
| 2015/0336459 A1 | 11/2015 | Nakamoto et al. |
| 2016/0172875 A1 | 6/2016 | Lee et al. |
| 2018/0257505 A1 | 9/2018 | Takatsuka et al. |
| 2019/0041467 A1 | 2/2019 | Takatsuka et al. |
| 2020/0169114 A1* | 5/2020 | Almeida ................ B60R 16/04 |

FOREIGN PATENT DOCUMENTS

| | | |
|---|---|---|
| EP | 3 127 739 A1 | 2/2017 |
| JP | H05-106539 A | 4/1993 |
| JP | H08-322159 A | 12/1996 |
| JP | 2007-145254 A | 6/2007 |
| JP | 2011-193715 | 9/2011 |
| JP | 2011-223856 A | 11/2011 |
| JP | 2012-016163 A | 1/2012 |
| JP | 2012-244724 A | 12/2012 |
| JP | 2013-017248 A | 1/2013 |
| JP | 2014-225942 A | 12/2014 |
| JP | WO2013/061484 A1 | 4/2015 |
| JP | 2015-201960 A | 11/2015 |
| JP | 2016-527868 A | 9/2016 |
| JP | 2017-103897 A | 6/2017 |
| JP | 2017-103898 A | 6/2017 |
| JP | 6436201 B2 | 12/2018 |
| WO | WO 2013/098903 A1 | 7/2013 |
| WO | WO 2014/073484 A1 | 5/2014 |
| WO | WO 2015/151262 A1 | 10/2015 |
| WO | WO 2017/094432 A1 | 6/2017 |

* cited by examiner

MANAGEMENT APPARATUS FOR ENERGY STORAGE DEVICE AND ENERGY STORAGE APPARATUS

TECHNICAL FIELD

The present invention relates to a management apparatus for an energy storage device and an energy storage apparatus.

BACKGROUND ART

Conventionally, a management apparatus for an energy storage device, used for activating a drive source, is known (e.g., see Patent Document 1). The battery management apparatus described in Patent Document 1 manages an energy storage device used for starting (cranking) an engine of a vehicle. Generally, such a management apparatus operates by power supplied from the energy storage device.

PRIOR ART DOCUMENT

Patent Document

Patent Document 1: Japanese Patent No. 6436201

SUMMARY OF THE INVENTION

Problems to be Solved by the Invention

Figure 8A:
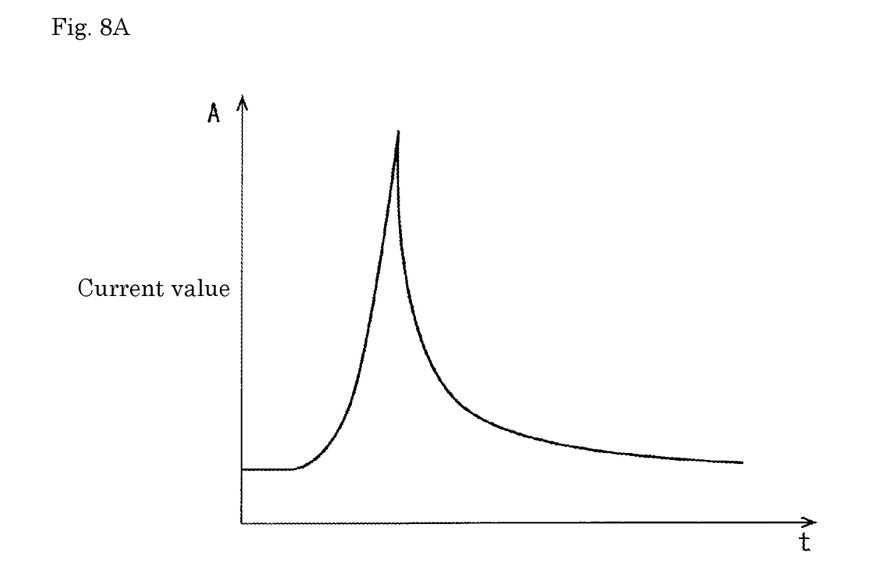
FIG. 8A is a graph illustrating a change in the discharge current of the energy storage device.

As illustrated in FIG. 8A, a large discharge current (hereinafter, simply referred to as a large current) may temporarily flow through the energy storage device used for activating the drive source. For example, in the case of an energy storage device used for starting an engine of a vehicle, a large current temporarily flows from the energy storage device to a starter of the vehicle at the time of starting the engine.

The capacity of the energy storage device used for activating the drive source varies. Conventionally, sufficient studies have not been made on a problem in a case where a large current temporarily flows through an energy storage device having a small capacity.

Means for Solving the Problems

In the present specification, a technique is disclosed in which, in a management apparatus that operates by power supplied from an energy storage device used for activation of a drive source, even when the capacity of the energy storage apparatus is small, an operation of the management apparatus is prevented from stopping due to instantaneous power interruption by a temporary large current.

A management apparatus for an energy storage device used for activating a drive source according to one aspect of the present invention includes: a management part that operates by power supplied from the energy storage device; and a backup power source that temporarily supplies power to the management part when a voltage of the energy storage device decreases.

Advantages of the Invention

In the management apparatus that operates by the power supplied from the energy storage device used for activating the drive source, it is possible to prevent the stop of the operation of the management apparatus due to instantaneous power interruption caused by the temporary large current even when the capacity of the energy storage apparatus is small.

MODE FOR CARRYING OUT THE INVENTION

Summary of Present Embodiment

A management apparatus for an energy storage device used for activating a drive source includes: a management part that operates by power supplied from the energy storage device; and a backup power source that temporarily supplies power to the management part when a voltage of the energy storage device decreases.

Figure 8B:
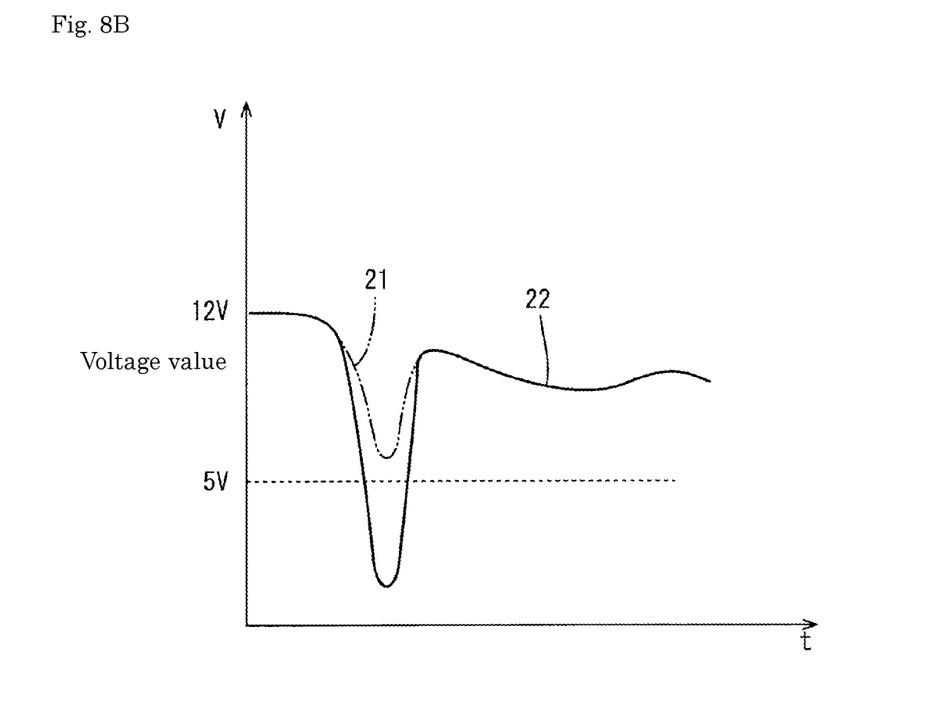
FIG. 8B is a graph illustrating a change in the voltage of the energy storage device.

The inventor of the present application has found that, when a large discharge current (large current) temporarily flows in an energy storage device having a small capacity, there is a higher possibility than in an energy storage device having a large capacity that the operation of the management apparatus stops due to instantaneous power interruption (blackout) in which the voltage of the energy storage device temporarily becomes lower the operating voltage of the management part. Hereinafter, a specific description will be given with reference to FIG. 8B. In the following description, it is assumed that the operating voltage of the management apparatus is 5 V.

When the capacity of the energy storage device is large, a decrease in voltage is small even when a large current flows. Therefore, as indicated by a dotted line 21 in FIG. 8B, even when a large current temporarily flows, the voltage is unlikely to decrease to less than the operating voltage (5 V) of the management part. In contrast, as indicated by a solid line 22, when the capacity of the energy storage device is small, the voltage greatly decreases even with the current of the same magnitude. Hence, it becomes more likely that the voltage decreases to less than 5 V. In other words, when the capacity of the energy storage device is small, there is a high possibility that instantaneous power interruption occurs.

According to the management apparatus, since the backup power source is provided, when the voltage of the energy storage device becomes lower than the voltage of the backup power source, power is supplied from the backup power source to the management part. This can prevent instantaneous power interruption. Therefore, in the management apparatus that operates by the power supplied from the energy storage device used for activating the drive source, it is possible to prevent the stop of the operation of the management apparatus due to instantaneous power interruption caused by the temporary large current even when the capacity of the energy storage apparatus is small.

When the temperature of the energy storage device is low, instantaneous power interruption is likely to occur due to an increase in internal resistance. According to the management apparatus, instantaneous power interruption can be prevented, so that the management apparatus is particularly useful in the case of being used at a low temperature when the internal resistance of the energy storage device is high or in a state where the internal resistance of the energy storage device has greatly increased.

The energy storage device may be used for starting an engine of a motorcycle.

In general, the magnitude of the charge-discharge current of the energy storage device is represented by C-rate. The C-rate is obtained by defining, as 1 C, a magnitude of a current flowing when an energy storage device in a state of charge (SOC) of 100% is discharged to 0% in one hour (alternatively, a magnitude of a current flowing in a case where the energy storage device in a SOC of 0% is charged to 100% in one hour). For example, when the energy storage device is discharged from the SOC of 100% to 0% in 30 minutes, the C-rate is 2 C.

When charge capacities of energy storage devices are different, C-rates are different even when current values of charge-discharge currents are the same. For example, it is assumed that there are an energy storage device B1 having a charge capacity of 100 Ah [ampere hour] and an energy storage device B2 having a charge capacity of 200 Ah, and the current value of the discharge current of each of these energy storage devices is 100 A [ampere]. In this case, the SOC of the energy storage device B1 becomes 0% in one hour, and hence the C-rate becomes 1 C. In contrast, the SOC of the energy storage device B2 becomes 0% in two hours, and hence the C-rate becomes 0.5 C. As described above, when the current value of the charge-discharge current is the same, the smaller the charge capacity is, the larger the C-rate becomes. In the following description, the C-rate being high is referred to as a high rate, and the C-rate being low is referred to as a low rate.

Normally, an energy storage device used for starting an engine of a motorcycle (an energy storage device for a two-wheeled vehicle) has a smaller charge capacity and a smaller charge-discharge current than an energy storage device used for starting an engine of a four-wheeled automobile (an energy storage device for a four-wheeled vehicle). However, the difference between the magnitudes of the charge-discharge currents is not as large as the difference between the charge capacities. For example, the charge capacity of the energy storage device for a two-wheeled vehicle is about one-third of the charge capacity of the energy storage device for a four-wheeled vehicle, and the magnitude of the discharge current of the energy storage device for a two-wheeled vehicle is about four-fifths of the discharge current of the energy storage device for a four-wheeled vehicle. Therefore, in general, the energy storage device for a two-wheeled vehicle is charged and discharged at a higher rate than the energy storage device for a four-wheeled vehicle.

In the case of discharge at a low rate, the voltage drop of the energy storage device is small as compared to the case of discharge at a high rate, so that there is a less possibility of instantaneous power interruption. For this reason, measures for preventing instantaneous power interruption have not been taken in the energy storage device that discharges at a low rate.

In contrast, in the case of discharge at a high rate, a decrease in voltage of the energy storage device is large as compared to the case of discharge at a low rate. The inventor of the present application focused on this point and found that the energy storage device for a two-wheeled vehicle discharged at a high rate is highly likely to cause instantaneous power interruption.

According to the management apparatus, the backup power source is provided in the management apparatus of the energy storage device for a two-wheeled vehicle in which instantaneous power interruption easily occurs, so that the instantaneous power interruption can be prevented in the management apparatus of the energy storage apparatus for a two-wheeled vehicle.

In general, the management apparatus of the energy storage device for a two-wheeled vehicle has low power consumption as compared to the management apparatus of the energy storage device for a four-wheeled vehicle, and hence the capacity of the backup power source may also be small. Therefore, there is also an advantage that instantaneous power interruption can be prevented at a low cost as compared to a case where the backup power source is provided in the management apparatus of the energy storage device for a four-wheeled vehicle.

The backup power source may temporarily supply power to the management part when the voltage of the energy storage device decreases.

In order to prevent instantaneous power interruption, power only has to be temporarily supplied to the management part. In this case, when a backup power source capable of supplying power for a certain long time is used, the backup power source becomes excessive, and the manufacturing cost of the management apparatus increases. According to the management apparatus, the backup power source temporarily supplies power to the management part, so that the manufacturing cost of the management apparatus can be held down as compared to the case of using the backup power source that can supply power for a certain long time.

The times during which the backup power source temporarily supplies power to the management part can be appropriately selected, but when the times during which the backup power source supplies power are long, it is necessary to increase the capacity of the backup power source. Thus, the time during which power is supplied is desirably within ten seconds, and more desirably within five seconds. When the duration of the instantaneous power interruption is less than one second, the times during which the backup power source supplies power may be within one second.

The backup power source may be a capacitor charged by the energy storage device.

Generally, the cost of the capacitor is low, and it is thus possible to achieve a backup power source that temporarily supplies power to the management part.

Assuming that the backup power source requires the control of the management part, when the voltage of the energy storage device decreases to, for example, a voltage close to 5 V, the management part needs to supply power to the backup power source by software control. However, in that case, the processing of the management part becomes complicated, and the response speed also becomes slow due to the software control. In contrast, when the voltage of the energy storage device becomes lower than the voltage of the capacitor, the capacitor automatically supplies power to the management part, so that the software control is unnecessary. Therefore, there is also an advantage that the processing of the management part is simplified. When the capacitor is used, instantaneous power interruption can be handled only by hardware, and hence there is also an advantage that instantaneous power interruption can be handled quickly as compared to the software control.

When the capacitor is used, there is also an advantage that noise can be removed at the same time.

The management apparatus may include a circuit breaker connected in series with the energy storage device, and a current sensor that detects a current value of a current flowing through the energy storage device, and the management part may turn off the circuit breaker when a current value equal to or larger than a predetermined value is detected by the current sensor.

When an external short circuit occurs, a large current (a current equal to or larger than a predetermined value) flows through the energy storage device. According to the management apparatus, when a large current flows, the energy storage device can be protected from the large current by the management part turning off the circuit breaker. However, when the voltage of the energy storage device becomes lower than the operating voltage of the management part due to the large current, the operation of the management part stops without the backup power source, so that the circuit breaker cannot be turned off.

According to the management apparatus, when the voltage of the energy storage device becomes lower than the voltage of the backup power source, the power is supplied from the backup power source to the management part. Thus, the management part operated by the power supplied from the backup power source turns off the circuit breaker, whereby the energy storage device can be protected from coming into the state of not being able to control the discharge of a large current due to an external short circuit.

A regulator that lowers a voltage of the energy storage device to the operating voltage of the management part may be provided between the energy storage device and the management part, and the backup power source may be provided on a power line branching from a power line connecting the regulator and the management part.

When the backup power source is provided, the backup power source can be provided between the energy storage device and the regulator, but in this case, a backup power source having a large capacity capable of storing the same voltage as the voltage of the energy storage device is required. In contrast, when the backup power source is provided between the regulator and the management part, the voltage is lowered by the regulator, so that the capacity of the backup power source can be reduced as compared to the case where the backup power source is provided between the energy storage device and the regulator. Therefore, instantaneous power interruption can be prevented at a lower cost.

The invention disclosed by the present specification can be achieved in various aspects such as an apparatus, a method, a computer program for achieving the apparatus or the method, and a recording medium on which the computer program is recorded.

First Embodiment

A first embodiment will be described with reference to FIGS. 1 to 8.

Figure 1:
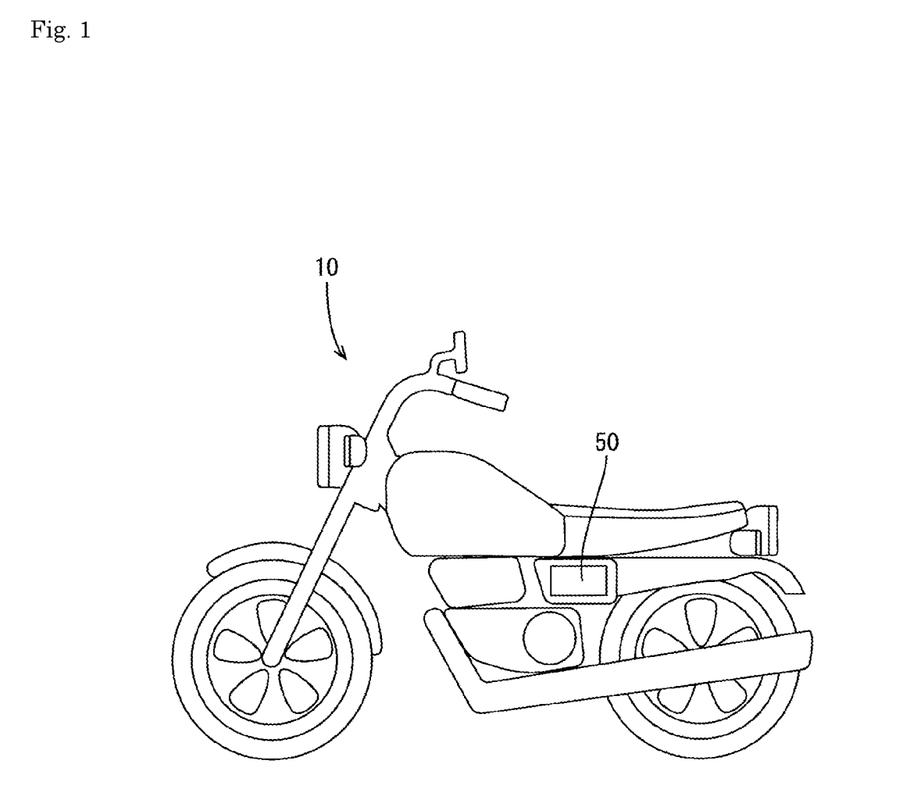
FIG. 1 is a side view of a motorcycle.

As illustrated in FIG. 1, a battery 50 (energy storage apparatus) according to the first embodiment is a battery for a two-wheeled vehicle mounted on a motorcycle 10.

Figure 2:
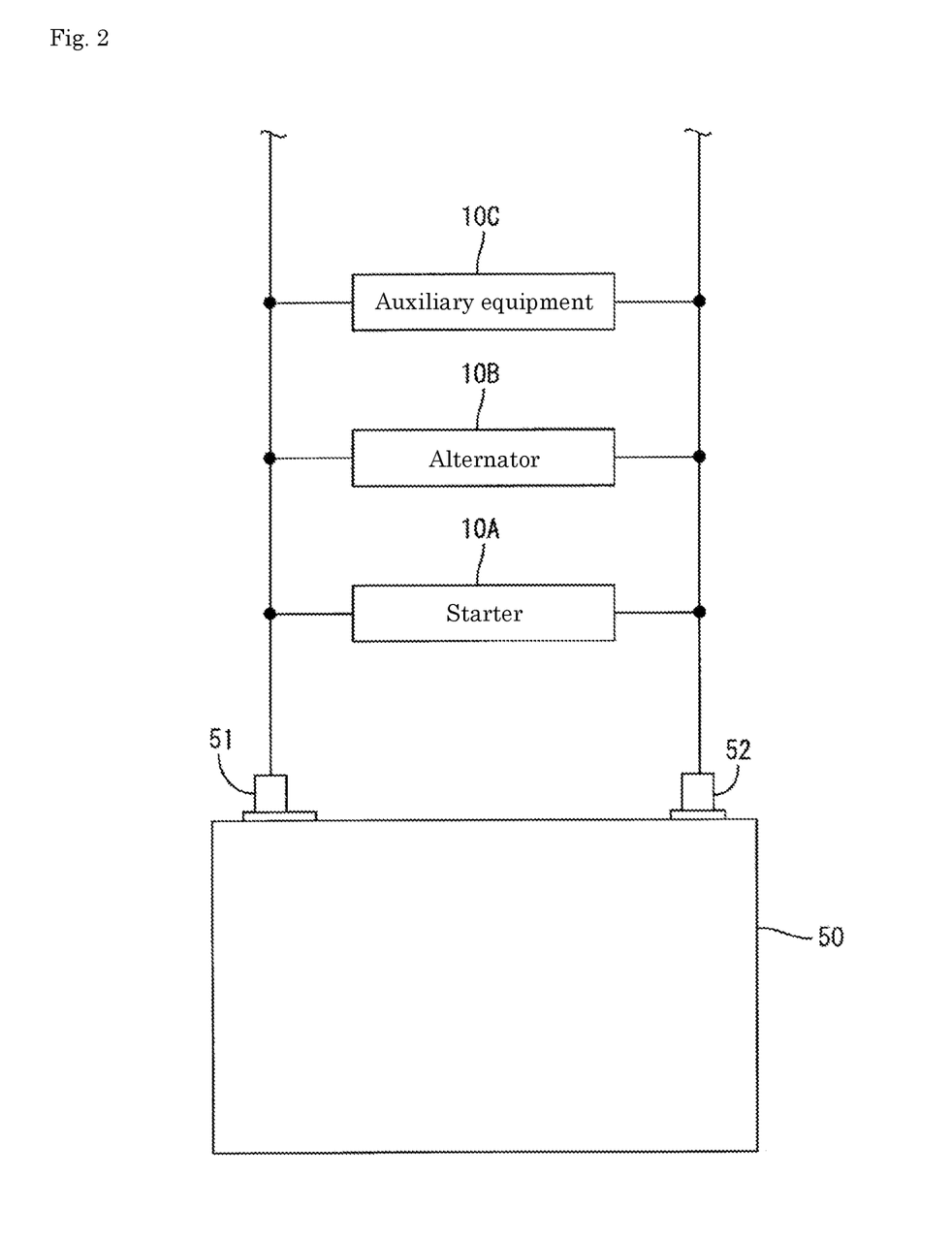
FIG. 2 is a block diagram of a vehicle system.

As illustrated in FIG. 2, a starter 10A, an alternator 10B, and auxiliary equipment 10C (headlights, air conditioners, audios, etc.), which are mounted on the motorcycle 10, are connected to the battery 50. The battery 50 is an engine starting battery that supplies power to the starter 10A to start an engine (an example of a drive source). The battery 50 is charged by the alternator 10B during engine operation.

Power is supplied from the alternator 10B to the auxiliary equipment 10C during the engine operation of the motorcycle 10. Thus, the battery 50 does not supply power to the auxiliary equipment 10C while the engine is operating, but when the auxiliary equipment 10C is used while the engine is stopped, the battery 50 also supplies power to the auxiliary equipment 10C.

In general, a battery for a two-wheeled vehicle does not have a function of communicating with an electronic control unit (ECU) of the motorcycle 10. The battery 50 for a two-wheeled vehicle according to the first embodiment also does not have a function of communicating with the ECU.

Figure 3:
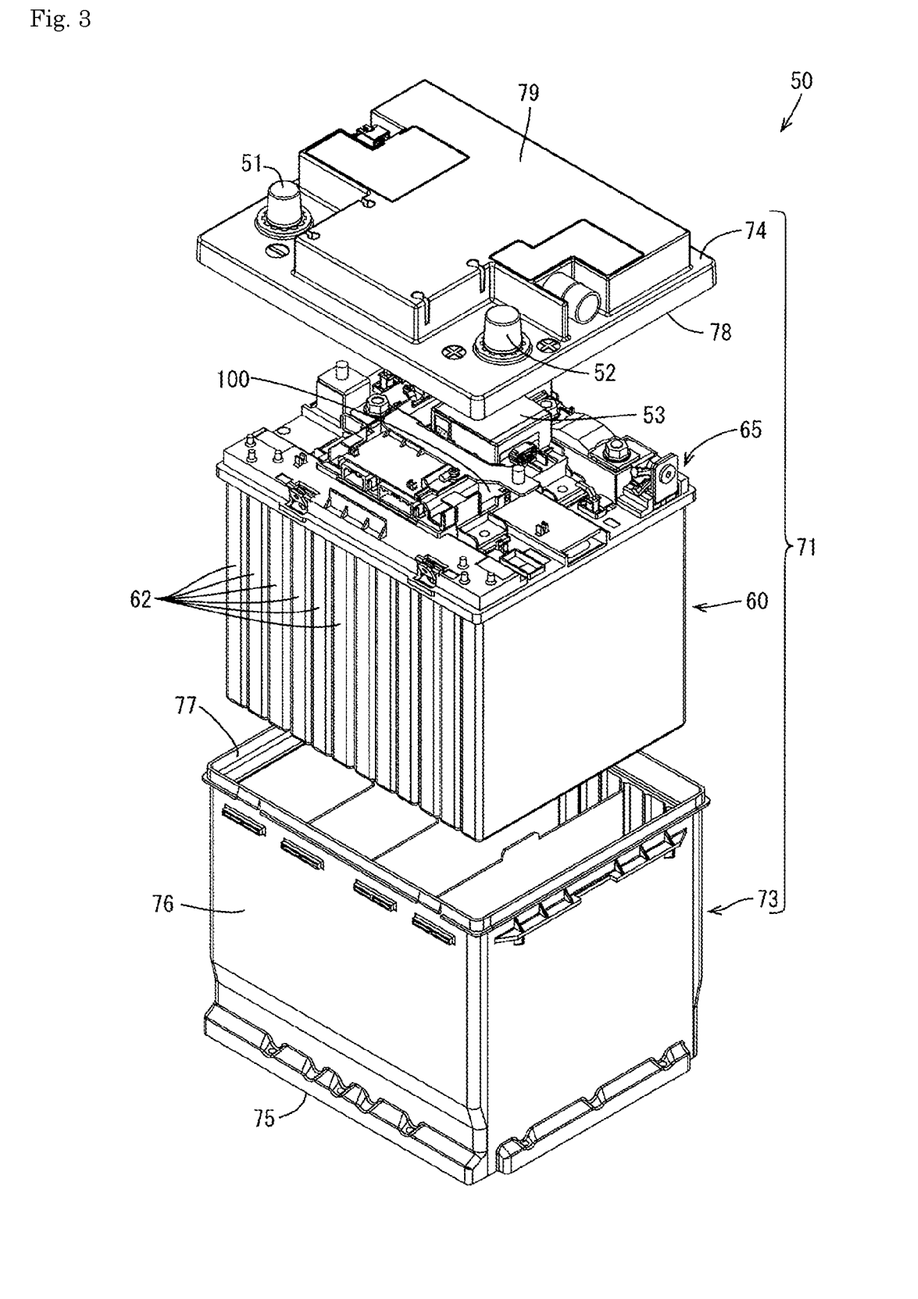
FIG. 3 is an exploded perspective view of a battery.

(1) As illustrated in FIG. 3, the battery 50 includes an assembled battery 60, a circuit board unit 65, and a housing 71.

The housing 71 includes a body 73 made of a synthetic resin material and a lid body 74. The body 73 has a bottomed cylindrical shape. The body 73 includes a bottom surface portion 75 and four side surface portions 76. An upper opening 77 is formed in an upper-end portion by the four side surface portions 76.

The housing 71 houses the assembled battery 60 and a circuit board unit 65. The assembled battery 60 includes 12 secondary batteries 62 (an example of an energy storage device). The secondary battery 62 is, for example, a lithium ion battery. The twelve secondary batteries 62 are connected with three in parallel and four in series. The circuit board unit 65 includes a circuit board 100 and an electronic component mounted on the circuit board 100 and is disposed on the assembled battery 60.

The lid body 74 closes the upper opening 77 of the body 73. An outer peripheral wall 78 is provided around the lid body 74. The lid body 74 has a protrusion 79 in a substantially T-shape in a plan view. A positive external terminal 51 is fixed to one corner of the front portion of the lid body 74, and a negative external terminal 52 is fixed to the other corner.

Figure 4:
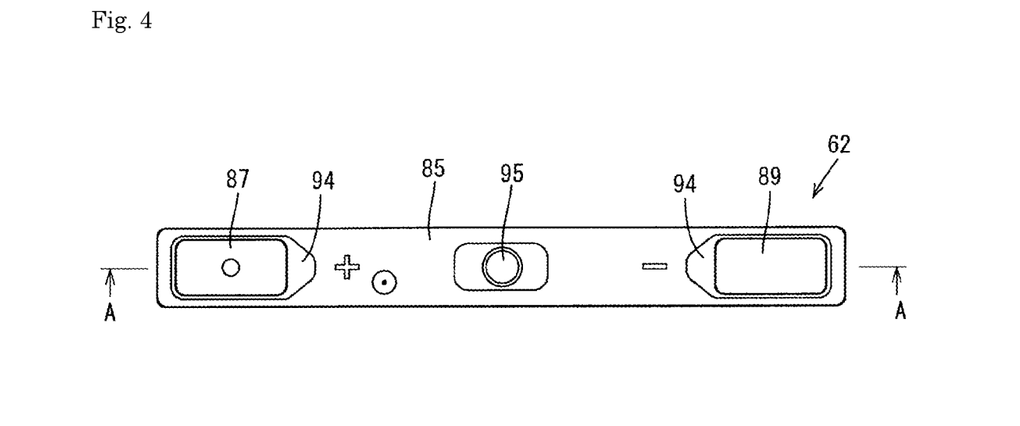
FIG. 4 is a plan view of a secondary battery.
Figure 5:
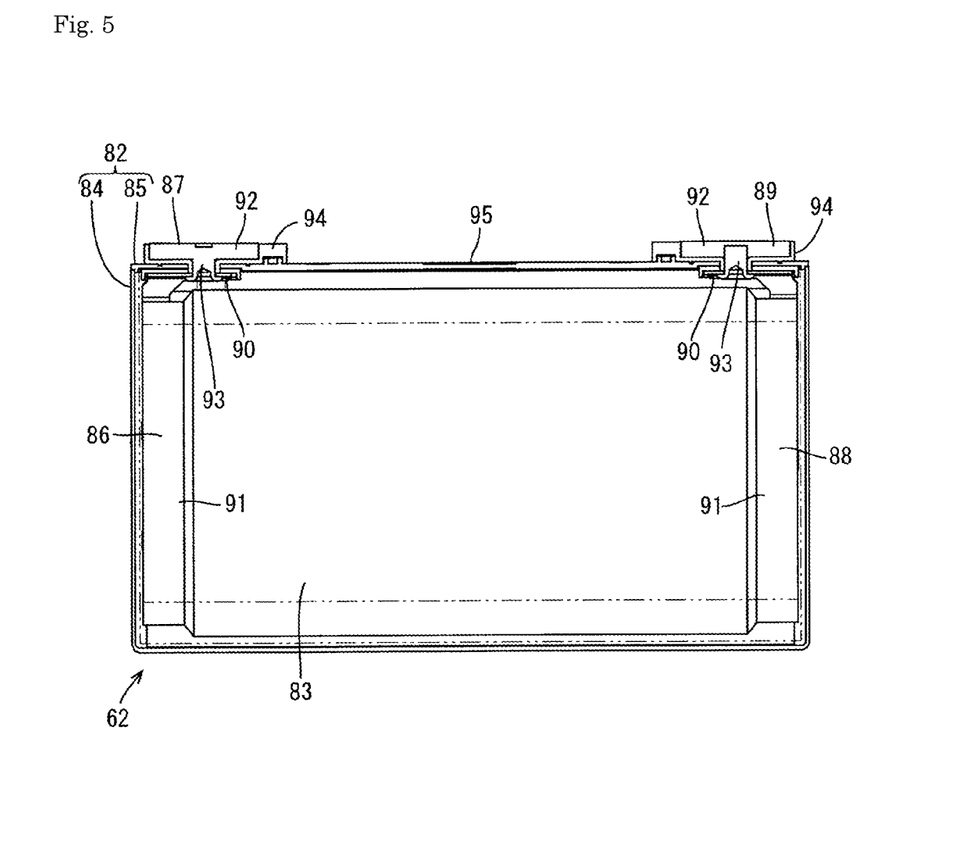
FIG. 5 is a cross-sectional view taken along line A-A in FIG. 4.

As illustrated in FIGS. 4 and 5, the secondary battery 62 houses an electrode assembly 83 together with a nonaqueous electrolyte in a case 82 having a rectangular parallelepiped shape. The case 82 has a case body 84 and a lid 85 for closing an opening at the top of the case body 84.

Although not shown in detail, the electrode assembly 83 has a separator, made of a porous resin film, disposed between a negative electrode element formed by applying an active material to a substrate made of copper foil and a positive electrode element formed by applying an active material to a substrate made of aluminum foil. These are all belt-shaped, and are wound in a flat shape so as to be able to be housed in the case body 84 in a state where the negative electrode element and the positive electrode element are displaced from each other on the opposite sides in the width direction with respect to the separator.

The positive electrode element is connected to a positive electrode terminal 87 via a positive current collector 86, and the negative electrode element is connected to a negative electrode terminal 89 via a negative current collector 88. Each of the positive current collector 86 and the negative current collector 88 is made up of a plate-shaped base 90 and legs 91 extending from the base 90. A through hole is formed in the base 90. The leg 91 is connected to the positive electrode element or the negative electrode element. Each of the positive electrode terminal 87 and the negative electrode terminal 89 is made up of a terminal body portion 92 and a shaft 93 protruding downward from the center portion of the lower surface of the terminal body portion 92. Among those, the terminal body portion 92 and the shaft 93 of the positive electrode terminal 87 are integrally formed of aluminum (single material). The negative electrode terminal 89 has the terminal body portion 92 made of aluminum and the shaft 93 made of copper and is assembled with these. The terminal body portions 92 of the positive electrode terminal 87 and the negative electrode terminal 89 are disposed at both ends of the lid 85 via gaskets 94 made of an insulating material and are exposed outward from the gaskets 94.

The lid 85 has a pressure release valve 95. As illustrated in FIG. 2, the pressure release valve 95 is located between the positive electrode terminal 87 and the negative electrode terminal 89. The pressure release valve 95 is opened when the internal pressure of the case 82 exceeds a limit value to lower the internal pressure of the case 82.

(2) Electrical Configuration of Battery

Figure 6:
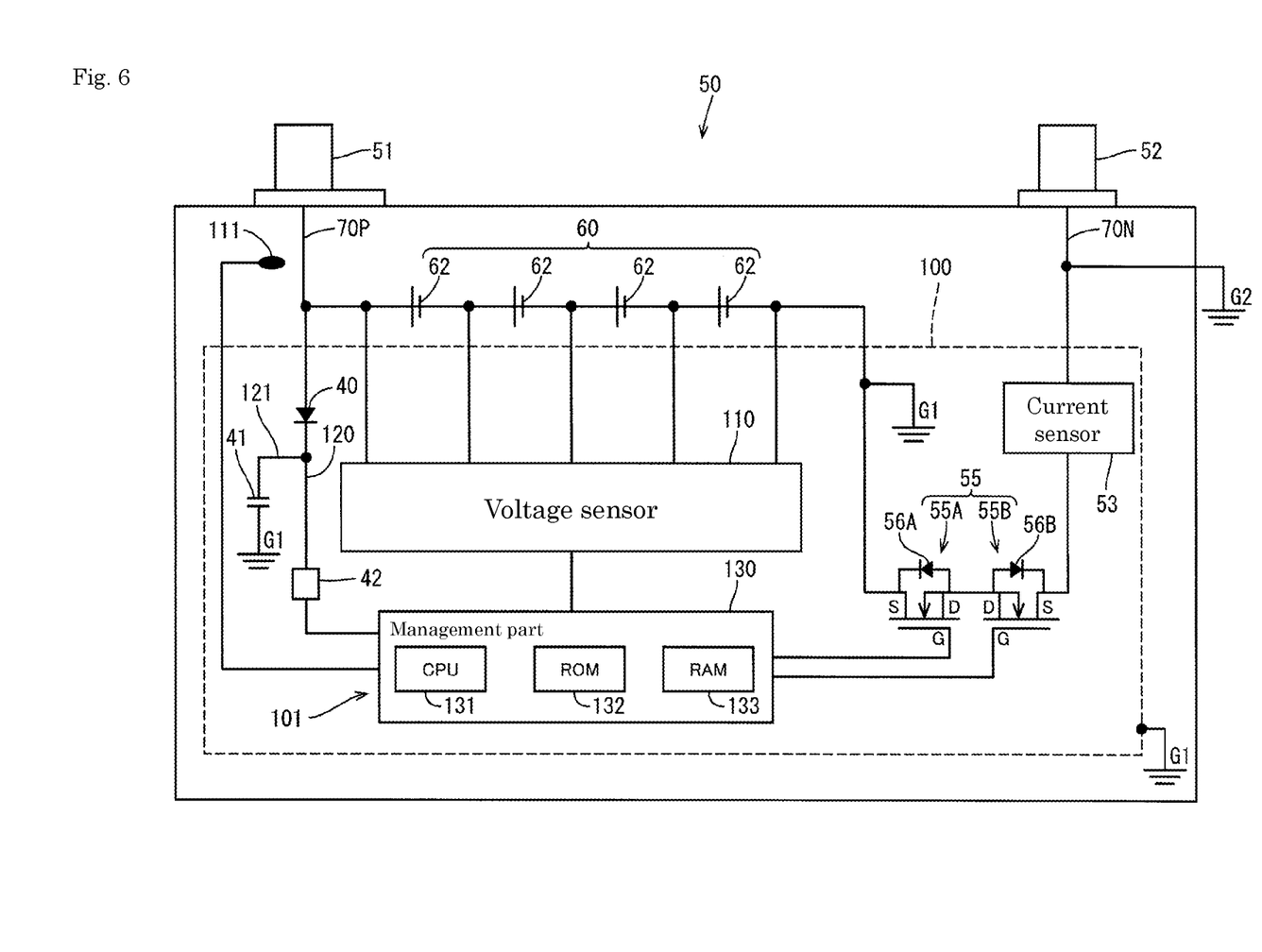
FIG. 6 is a block diagram of a battery.

As illustrated in FIG. 6, the battery 50 includes an assembled battery 60 and a battery management unit (BMU) 101 that manages the assembled battery 60. The BMU 101 is an example of a management apparatus.

The assembled battery 60 includes a plurality of secondary batteries 62. The twelve secondary batteries 62 are connected with three in parallel and four in series. In FIG. 6, three secondary batteries 62 connected in parallel are represented by one battery symbol. The battery 50 is rated at 12 V.

A power line 70P is a power line for connecting the positive external terminal 51 and the positive electrode of the assembled battery 60. A power line 70N is a power line for connecting the negative external terminal 52 to the negative electrode of the assembled battery 60. The negative electrode of the assembled battery 60 is connected to a signal ground G1. The assembled battery 60 has the signal ground G1 as a reference potential. The negative external terminal 52 is connected to a body ground G2. The body ground G2 is the body of the motorcycle 10. The body ground G2 is the reference potential of the motorcycle 10.

The BMU 101 includes a current sensor 53, a voltage sensor 110, a temperature sensor 111, a circuit breaker 55, a management part 130, a diode 40 (rectifier device), a capacitor 41 (an example of a backup power source), and a regulator 42. The assembled battery 60, the current sensor 53, and the circuit breaker 55 are connected in series via the power line 70P and the power line 70N. The circuit breaker 55, the current sensor 53, the voltage sensor 110, the management part 130, the diode 40, the capacitor 41, and the regulator 42 are mounted on the circuit board 100, and the signal ground G1 of the circuit board 100 is set as a reference potential (operation reference).

The current sensor 53 is located on the negative electrode side of the assembled battery 60 and is provided on the power line 70N on the negative electrode side. The current sensor 53 detects a current I of the assembled battery 60.

The voltage sensor 110 detects a voltage V of each secondary battery 62 and the total voltage of the assembled battery 60. The total voltage of the assembled battery 60 is the total voltage of the four secondary batteries 62.

The temperature sensor 111 is provided in any one or two of the secondary batteries 62, detects the temperature of the secondary battery 62, and outputs the temperature to the management part 130.

The circuit breaker 55 is located at the negative electrode of the assembled battery 60 and is provided in the power line 70N of the negative electrode. The circuit breaker 55 includes a charging field-effect transistor (FET) 55A and a discharging FET 55B. The charging FET 55A and the discharging FET 55B are power semiconductor switches, more specifically, N-channel field-effect transistors (FETs). Sources S of the charging FET 55A and discharging FET 55B are reference terminals. Gates G of the charging FET 55A and the discharging FET 55B are control terminals. Drains D of the charging FET 55A and discharging FET 55B are connection terminals.

In the charging FET 55A, the source S is connected to the negative electrode of the assembled battery 60. The source S of the discharging FET 55B is connected to the negative external terminal 52. The charging FET 55A and the discharging FET 55B are connected back-to-back by the drains D being connected to each other.

The charging FET 55A includes a parasitic diode 56A. The forward direction of the parasitic diode 56A is the same as the discharge direction. The discharging FET 55B includes a parasitic diode 56B. The forward direction of the parasitic diode 56B is the same as the charging direction.

Since the source S of the discharging FET 55B is connected to the negative external terminal 52, the body ground G2 is a reference potential. In the charging FET 55A, the source S is connected to the negative electrode of the assembled battery 60. Since the negative electrode of the assembled battery 60 is connected to the signal ground G1 of the circuit board 100, the signal ground G1 is a reference potential in the charging FET 55A.

The charging FET 55A is turned on by an H-level voltage being applied to the gate G and is turned off by an L-level voltage being applied to the gate G. The same applies to the discharging FET 55B.

The management part 130 is operated by power supplied from the secondary battery 62 and includes a central processing unit (CPU) 131, a read-only memory (ROM) 132, and a random-access memory (RAM) 133. The operating voltage of the management part 130 is 5 V. The management part 130 manages the battery 50 based on the outputs of the voltage sensor 110, the current sensor 53, and the temperature sensor 111. In a normal state, the management part 130 applies an H-level voltage to each of the gate G of the charging FET 55A and the gate G of the discharging FET 55B to turn on the charging FET 55A and the discharging FET 55B. When both the charging FET 55A and the discharging FET 55B are on, the assembled battery 60 can perform both charge and discharge.

The regulator 42 is a circuit that steps down a voltage of 12 V supplied from the secondary battery 62 to 5 V that is the operating voltage of the management part 130. The regulator 42 is provided in a power line 120 that supplies the power of the secondary battery 62 to the management part 130. The power line 120 branches from the power line 70P. When the operating voltage of the management part 130 is 12 V or when the management part 130 itself includes a regulator, the regulator 42 is unnecessary.

The diode 40 is provided between the regulator 42 and the assembled battery 60 in the power line 120. A current flows through the diode 40 in a direction from the secondary battery 62 toward the management part 130. The diode 40 prevents the voltage of the capacitor 41 from decreasing when the voltage of the assembled battery 60 decreases.

The capacitor 41 is provided in a power line 121 branching from between the diode 40 and the regulator 42 in the power line 120. The capacitor 41 is charged with 12 V by the assembled battery 60, and when the total voltage of the assembled battery 60 becomes lower than the voltage of the capacitor 41, power of 5 V or more is temporarily supplied to the management part 130.

The time during which the capacitor 41 temporarily supplies power to the management part 130 can be selected as appropriate, but when the time during which the power is supplied is long, it is necessary to increase the capacity of the capacitor 41. Thus, the time during which power is supplied is desirably within ten seconds, and more desirably within five seconds. When the time during which instantaneous power interruption continues is less than one second, the time during which the capacitor 41 supplies power may be within one second.

(3) Processing Executed by Management Part

Of the processing executed by the management part 130, SOC estimation processing, overcharge-overdischarge protection processing, and overcurrent protection processing will be described.

(3-1) SOC Estimation Processing

The SOC estimation processing is processing of estimating the state of charge of the secondary battery 62 by the current integration method. The current integration method is a method in which the amount of power flowing into and out of the secondary battery 62 is measured by measuring the charge-discharge current of the secondary battery 62 at predetermined time intervals with the current sensor 53 and is then added to or subtracted from the initial capacity to estimate the SOC.

The current integration method has the advantage that the SOC can be estimated even when the secondary battery 62 is in use, but the current sensor 53 always measures the current and integrates the charge-discharge power amount, so that the measurement error of the current sensor 53 may accumulate and become increasingly inaccurate. Therefore, the management part 130 may reset the SOC to be estimated by the current integration method based on the open-circuit voltage (OCV) of the secondary battery 62.

Specifically, there is a relatively accurate correlation between the OCV and the SOC, and hence the SOC may be estimated from the OCV, and the SOC estimated by the current integration method may be reset to the SOC estimated from the OCV.

The OCV is not limited to a voltage in a state where the circuit is open. For example, the OCV may be a voltage when the current value of the current flowing through the secondary battery 62 is less than a minute reference value.

(3-2) Overcharge-Overdischarge Protection Processing

The overcharge-overdischarge protection processing is processing of protecting the secondary battery 62 from overcharge by turning off the charging FET 55A when the SOC becomes equal to or larger than a predetermined value and is processing of protecting the secondary battery 62 from overdischarge by turning off the discharging FET 55B when the SOC becomes equal to or smaller than a predetermined lower limit value.

(3-3) Overcurrent Protection Processing

The overcurrent protection processing is processing of protecting the secondary battery 62 from a large current by turning off the discharging FET 55B when a large current flows through the secondary battery 62 due to an external short circuit. Specifically, the management part 130 detects a current value at predetermined time intervals with the current sensor 53 and turns off the discharging FET 55B when a current value equal to or larger than a predetermined value is detected. The predetermined value is a value larger than a current value of a large current flowing at the time of engine start.

(4) Operation of Capacitor

Figure 7:
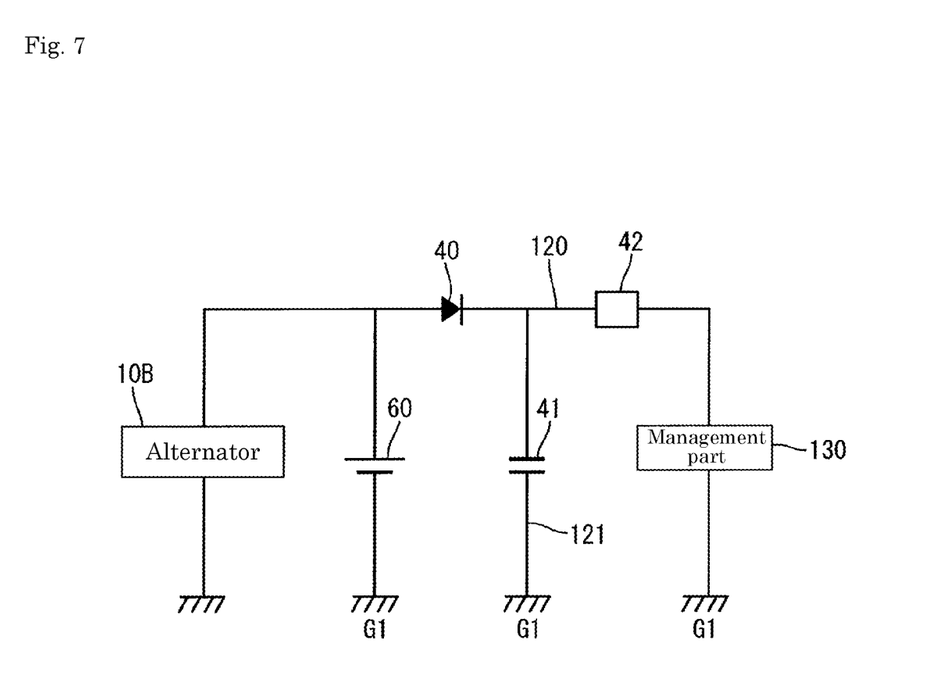
FIG. 7 is a circuit diagram of an alternator, an energy storage device, a management part, and a backup power source.

The operation of the capacitor 41 will be described with reference to FIG. 7. With the assembled battery 60 being charged and discharged at a high rate, a large current may temporarily flow at the time of starting the engine, so that the total voltage may decrease to less than 5 V. When the total voltage of the assembled battery 60 decreases to less than 5 V, the total voltage of the assembled battery 60 becomes lower than the voltage of the capacitor 41, and hence power is temporarily supplied from the capacitor 41 to the management part 130.

Since it is temporary that the total voltage of the assembled battery 60 decreases to less than 5 V at the time of starting the engine, when the voltage of the assembled battery 60 recovers thereafter, power is supplied from the assembled battery 60 to the management part 130. Therefore, the management part 130 continues to operate even when the total voltage of the assembled battery 60 temporarily decreases to less than 5 V at the time of starting the engine. In other words, the SOC estimation processing and the overcharge-overdischarge protection processing described above are executed continuously.

With the assembled battery 60 being charged and discharged at a high rate, even when an external short circuit occurs, the total voltage of the assembled battery 60 may decrease to less than 5 V due to a large current flowing. Even when the total voltage of the assembled battery 60 decreases to less than 5 V due to an external short circuit, power is temporarily supplied from the capacitor 41 to the management part 130.

The reason why power is supplied from the capacitor 41 to the management part 130 when an external short circuit occurs is that the management part 130 is required to be temporarily utilized so as to execute the overcurrent protection processing described above. Specifically, when a large current flows due to an external short circuit, the current value becomes equal to or larger than a predetermined value, so that the management part 130 operated by the power supplied from the capacitor 41 detects that the current value is equal to or larger than the predetermined value, and turns off the discharging FET 55B. As a result, the secondary battery 62 is protected from a large current due to an external short circuit. Thereafter, when power is no longer supplied from the capacitor 41, the management part 130 stops operating.

(5) Effects of Embodiment

According to the BMU 101, the backup power source (capacitor 41) is provided, and when the voltage of the assembled battery 60 becomes lower than the voltage of the backup power source, power is supplied from the backup power source to the management part 130. This can prevent instantaneous power interruption. Thus, in the BMU 101 operated by the power supplied from the two-wheeled-bicycle secondary battery 62, even when the capacity of the secondary battery 62 is small, it is possible to prevent the stop of the operation of the BMU 101 due to the instantaneous power interruption by the temporary large current.

When the temperature of the secondary battery 62 is low, instantaneous power interruption is likely to occur due to an increase in internal resistance. According to the BMU 101, instantaneous power interruption can be prevented, so that the BMU 101 is particularly useful in the case of being used at a low temperature when the internal resistance of the secondary battery 62 is high or in a state where the internal resistance of the secondary battery 62 has greatly deteriorated.

According to the BMU 101, since the backup power source is provided in the BMU 101 of the secondary battery 62 for a two-wheeled vehicle in which instantaneous power interruption easily occurs, the instantaneous power interruption can be prevented in the secondary battery 62 for a two-wheeled vehicle.

In general, the BMU 101 of the secondary battery 62 for a two-wheeled vehicle has a low operating voltage as compared to the BMU of the secondary battery 62 for a four-wheeled vehicle, and hence the capacity of the backup power source may also be small. Therefore, there is also an advantage that instantaneous power interruption can be prevented at a low cost as compared to a case where the backup power source is provided in the BMU of the secondary battery 62 for a four-wheeled vehicle.

According to the BMU 101, the backup power source temporarily supplies power to the management part 130, so that the manufacturing cost of the BMU 101 can be held down as compared to the case of using the backup power source that can supply power for a certain long time.

According to the BMU 101, the backup power source is a capacitor 41 charged by the secondary battery 62. Generally, the cost of the capacitor is low, and it is thus possible to achieve a backup power source that temporarily supplies power to the management part.

When the voltage of the energy storage device becomes lower than the voltage of the capacitor 41, the capacitor 41 automatically supplies power to the management part 130, so that the software control is unnecessary. Therefore, there is also an advantage that the processing of the management part 130 is simplified. When the capacitor 41 is used, instantaneous power interruption can be handled only by hardware, and hence there is also an advantage that instantaneous power interruption can be handled quickly as compared to the software control.

When the capacitor 41 is used, there is also an advantage that noise can be removed at the same time.

According to the BMU 101, even when the voltage of the assembled battery 60 decreases due to the external short circuit, the management part 130 supplied with power from the capacitor 41 turns off the discharging FET 55B, whereby the secondary battery 62 can be protected from being in the state of not being able to control the discharge of a large current due to an external short circuit.

Other Embodiments

The technique disclosed in the present specification is not limited to the embodiment described with reference to the above description and drawings, and for example, such embodiments as follows are also included in the technical scope disclosed in the present specification.

(1) In the above embodiment, the capacitor 41 has been described as an example of the backup power source, but the backup power source is not limited thereto. For example, the backup power source may be a primary battery such as a button battery (an example of a backup power source that can supply power for a certain long time).

(2) In the above embodiment, the case where the capacitor 41 is provided between the secondary battery 62 and the regulator 42 has been described as an example, but the capacitor 41 may be provided between the regulator 42 and the management part 130. When the backup power source is provided between the regulator 42 and the management part 130, the voltage is lowered by the regulator 42, so that the capacity of the capacitor 41 can be reduced as compared to the case where the capacitor 41 is provided between the secondary battery 62 and the regulator 42. Therefore, instantaneous power interruption can be prevented at a lower cost.

(3) In the above embodiment, the secondary battery 62 for a two-wheeled vehicle has been described as an example of the secondary battery used for activating the drive source, but the secondary battery used for starting the drive source is not limited thereto. For example, an electric vehicle, a hybrid vehicle, or the like includes a driving battery for supplying power to an electric motor that is a drive source of the vehicle. In general, a driving battery is started by power supplied from an external secondary battery and supplies power to an electric motor. The secondary battery used for starting the drive source may be used as the external secondary battery described above.

(4) In the above embodiment, the secondary battery 62 has been described as an example of the energy storage device, but the energy storage device is not limited thereto. For example, the energy storage device may be a capacitor accompanied by an electrochemical reaction.

DESCRIPTION OF REFERENCE SIGNS

10: motorcycle
41: capacitor (example of backup power source)
42: regulator
53: current sensor
55: circuit breaker
62: secondary battery (example of energy storage device)
101: BMU (example of management apparatus)
130: management part

The invention claimed is:

1. A management apparatus for an energy storage device used for activating a drive source, the management apparatus comprising:
   a management part that operates by power supplied from the energy storage device;
   a backup power source that supplies power to the management part when a voltage of the energy storage device decreases;
   a circuit breaker connected in series with the energy storage device; and
   a current sensor that detects a current value of a current flowing through the energy storage device,
   wherein the management part turns off the circuit breaker when a current value equal to or larger than a predetermined value is detected by the current sensor.

2. The management apparatus according to claim 1, wherein the energy storage device is for starting an engine of a motorcycle.

3. The management apparatus according to claim 1, wherein the backup power source temporarily supplies power to the management part when a voltage of the energy storage device decreases.

4. The management apparatus according to claim 3, wherein the backup power source comprises a capacitor charged by the energy storage device.

5. The management apparatus according to claim 1, wherein the management part turns off the circuit breaker when a current value equal to or larger than the predetermined value is detected by the current sensor due to an external short circuit.

6. A management apparatus for an energy storage device used for activating a drive source, the management apparatus comprising:
- a management part that operates by power supplied from the energy storage device;
- a backup power source that supplies power to the management part when a voltage of the energy storage device decreases; and
- a regulator that lowers a voltage of the energy storage device to an operating voltage of the management part, the regulator provided between the energy storage device and the management part,
- wherein the backup power source is provided on a power line branching from a power line connecting the regulator and the management part.

7. An energy storage apparatus comprising:
- an energy storage device; and
- a management apparatus,
- wherein the management apparatus includes
- a management part that operates by power supplied from the energy storage device, and
- a backup power source that supplies power to the management part when a voltage of the energy storage device decreases,
- the energy storage apparatus is rated at 12 volts,
- the management apparatus includes
- a circuit breaker connected in series with the energy storage device, and
- a current sensor that detects a current value of a current flowing through the energy storage device, and
- the management part turns off the circuit breaker when a current value equal to or larger than a predetermined value is detected by the current sensor.

8. The energy storage apparatus according to claim 7, wherein an operating voltage of the management part included in the management apparatus is 5 V.

9. The energy storage apparatus according to claim 7, wherein the management part turns off the circuit breaker when a current value equal to or larger than the predetermined value is detected by the current sensor due to an external short circuit.

10. The energy storage apparatus according to claim 7, wherein the energy storage apparatus is for a motorcycle.

11. The energy storage apparatus according to claim 7, wherein the energy storage apparatus is used for activating a driving battery of an automobile.

12. The energy storage apparatus according to claim 7, further comprising a housing that houses the energy storage device and the management apparatus.

13. The energy storage apparatus according to claim 12, wherein a positive external terminal connected to a positive electrode of the energy storage device by a power line and a negative external terminal connected to a negative electrode of the energy storage device by the power line are fixed to the housing.

14. The management apparatus according to claim 1, wherein the backup power source temporarily supplies power for a predetermined time to the management part when a voltage of the energy storage device decreases.

15. The management apparatus according to claim 1, wherein the backup power source exclusively supplies power to the management part when a voltage of the energy storage device decreases to a predetermined level.

16. The energy storage apparatus according to claim 7, wherein the backup power source exclusively supplies power to the management part when a voltage of the energy storage device decreases to a predetermined level.

17. An energy storage apparatus comprising:
- an energy storage device; and
- a management apparatus,
- wherein the management apparatus includes
- a management part that operates by power supplied from the energy storage device, and
- a backup power source that supplies power to the management part when a voltage of the energy storage device decreases,
- the energy storage apparatus is rated at 12 volts,
- a regulator that lowers a voltage of the energy storage device to an operating voltage of the management part is provided between the energy storage device and the management part, and
- the backup power source is provided on a power line branching from a power line connecting the regulator and the management part.

* * * * *